3,721,710
SUBSTITUTED ANILIDES
John Krapcho, Somerset, N.J., assignor to E. R. Squibb & Sons, Inc., New York, N.Y.
No Drawing. Continuation-in-part of application Ser. No. 808,351, Mar. 18, 1969, which is a continuation-in-part of application Ser. No. 414,838, Nov. 30, 1964. This application May 7, 1971, Ser. No. 141,399
Int. Cl. C07c 103/34
U.S. Cl. 260—562 R
2 Claims

ABSTRACT OF THE DISCLOSURE

Disclosed herein are novel anilide derivatives useful as central nervous system depressants.

---

This is a continuation-in-part application of my U.S. patent application, Ser. No. 808,351, now abandoned, filed Mar. 18, 1969 which was a continuation-in-part of my U.S. patent application, Ser. No. 414,838, now abandoned, filed Nov. 30, 1964.

This invention relates to new compounds and more particularly to bases of the general Formula I (I)
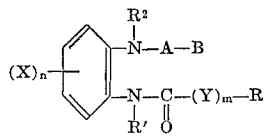

and pharmaceutically acceptable acid-addition and quaternary ammonium salts thereof, wherein X is hydrogen, halogen (e.g., chloro and bromo), trifluoromethyl, dialkylamino, amino, lower alkyl, lower alkoxy, hydroxy and lower alkanoyl (e.g., acetyl and propionyl); $n$ is 1, 2 or 3; A is lower alkylene; B is a basic nitrogen-containing radical of less than twelve carbon atoms; R' is hydrogen, lower alkyl or monocyclic aryl (lower alkyl) (e.g., benzyl and phenethyl); $R^2$ is hydrogen, lower alkyl, X-substituted phenylalkylene (e.g., 4 - chlorophenethyl, cycloalkyl-alkylene [(e.g., 2-(cyclopentyl)ethyl)] or acyl groups shown by the general formula CO—(Y)$m$R; Y is lower alkylene, lower alkenylene, or lower alkadienylene (e.g., —CH=CH—CH=CH—), alkyne (e.g.,

—C≡C—)

$m$ is zero or one; and R is hydrogen, lower alkyl, cycloalkyl (e.g., cyclopentyl and cyclohexyl), and (X)$_n$-substituted phenyl, furyl, thienyl, pyridyl or piperonyl.

Among the suitable radicals represented by the symbol B are: amino; (lower alkyl)amino; di(lower alkyl) amino; (hydroxy-lower alkyl)amino; di(hydroxy-lower alkyl)amino; (X)$_n$-substituted phenyl (lower alkyl) amino; N-(lower alkyl)-N[(X)$_n$-substituted phenyl (lower alkyl)]amino; allylamino; diallylamino; and saturated five- to six-membered monocyclic heterocyclic radicals of less than twelve carbon atoms, as exemplified by piperidino;
(lower alkyl)piperidino;
di(lower alkyl)piperidino;
(lower alkoxy)piperidino;
2,3 or 4-piperidyl;
2,3 or 4-(N-lower alkyl)piperidyl;
pyrrolidino;
(lower alkyl)pyrrolidino;
di(lower alkyl)pyrrolidino;
(lower alkoxy)pyrrolidino;
2 or 3-pyrrolidyl;
2 or 3-(N-lower alkyl-pyrrolidyl);
morpholino;
(lower alkyl)morpholino;
di(lower alkyl)morpholino;
(lower alkoxy)morpholino;
thiamorpholino;
(lower alkyl)thiamorpholino;
di(lower alkyl)thiamorpholino;
(lower alkoxy)thiamorpholino;
piperazino;
(lower alkyl)piperazino (e.g., $N^4$-methylpiperazino);
di(lower alkyl)piperazino;
(lower alkoxy)piperazino;
(hydroxy-lower alkyl)piperazino (e.g., $N^4$-2-hydroxyethylpiperazino);
(lower alkanoyloxy-lower alkyl)piperazino (e.g., $N^4$-2-acetoxyethylpiperazino);
(hydroxy-lower alkoxy-lower alkyl)piperazino (e.g., $N^4$-2-hydroxy-ethoxyethyl)piperazino, phenylpiperazino;
$N^4$-[(X)$_n$-substituted phenyl]piperazino [e.g., 4(p-chlorophenyl)piperazino];
$N^4$-[(X)$_n$-substituted phenyl-A-]-piperazino [e.g., 4(o-methoxyphenylethyl)piperazino];
$N^4$-[(X)$_n$-substituted cinnamyl]piperazino [e.g., 4(p-dimethylamino cinnamyl)piperazino];
4-(2,3 or 4-pyridyl)piperazino;
4-(2-pyrimidyl)piperazino;
N-(lower alkyl)-N-(cycloalkyl alkyl)amino [e.g., N-methyl-N-cyclopropylmethyl];
N-(lower alkyl)-N-propargylamino; and
N-(lower alkyl)-N-(X-substituted)cinnamylamino.

The terms "lower alkyl," "lower alkoxy," "lower alkylene," and "lower alkenylene" as employed herein, include both straight and branched chain radicals of less than eight carbon atoms, preferably from one to six carbons.

The preferred compounds are those wherein X is hydrogen or chloro; $n$ is one; B is di(lower alkyl)amino, $N^4$-methylpiperazino or lower alkoxyphenylpiperazino; A is ethylene or propylene; R' is hydrogen; Y is ethylene, propylene, vinylene (—CH=CH—) or —C≡C—; $m$ is one; $R^2$ is alkyl and R is phenyl, halophenyl, 2-thienyl, 2-furyl or pyridyl. Particularly preferred are those compounds wherein X is hydrogen; B is di(lower alkyl)amino or lower alkoxyphenylpiperazino; A is ethylene or propylene; Y is vinylene; $m$ is one; and $R^2$ is lower alkyl.

As to the salts, those coming within the purview of this invention include acid-addition salts, particularly the nontoxic acid-addition and quaternary ammonium salts, particularly the non-toxic quaternary ammonium salts. Acids useful for preparing the acid-addition salts include, inter alia, inorganic acids, such as hydrohalic acids (e.g., hydrochloric and hydrobromic acid), and sulfuric acid, nitric acid, boric acid and phosphoric acid, and organic acids, such as oxalic, tartaric, malic, citric, acetic, succinic, sulfonic, benzenesulfonic, cyclohexylsulfamic, toluenesulfonic acid and so forth. The acid addition-salts frequently provide a convenient means for isolating the compound, e.g., by precipitating the salt in an appropriate menstruum in which the salt is insoluble, then after separation of the salt, neutralizing with a base such as sodium hydroxide, to obtain the free base of Formula I.

Salts useful in preparing the quaternary ammonium salts include, inter alia, the lower alkyl halides and sulfates (e.g., methyl bromide and diethyl sulfate) and the monocyclic aryl(lower alkyl) halides and sulfates (e.g., benzyl chloride).

The compounds of this invention are therapeutically active substances which possess analgesic activities and shows activity as a central nervous system depressant. The compounds of this invention can be administered orally or parenterally to produce tranquilization or sedation, or in the treatment of hypertension, the dosage for such treatments being adjusted in a manner similar to hydroxyzine.

Tablets, capsules, elixirs, injectables and the like, incorporating the required dosage of the base of Formula I or a physiologically acceptable acid-addition salt or quaternary ammonium salt thereof together with carriers, excipients, lubricants, etc., according to accepted pharmaceutical practices, may be administered.

The compounds of this invention can be prepared by a variety of methods. The preferred and general method for preparing the compounds of this invention involves reacting a compound of the general Formula II:

(II) 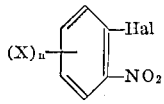

wherein Hal is a halogen, e.g., chloro or bromo, and X and $n$ are as hereinbefore defined with a diamine of the formula $$H-N(R^2)-A-B$$

wherein $R^2$, A and B are as herein defined to yield new intermediates of this invention of the general Formula III:

(III) 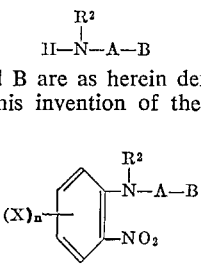

wherein $R^2$, X, $n$, A and B are as herein defined.

Suitable diamines that may be utilized in the practice of the invention are:

N,N,N'-trimethylethylenediamine;
N,N-diethyl-N'-methylethylenediamine;
2-piperidinoethylmethylamine;
N,N-diethyl-N'-methyl-1,3-propanediamine;
N,N,N'-triethylethylenediamine;
N,N-diethyl-N'-propylethylenediamine;
N,N-diethyl-N'-isopropylethylenediamine;
N-benzyl-N',N'-diethylethylenediamine;
N,N'-dimethyl-N-phenethylethylenediamine;
N,N-diisopropyl-N'-methylethylenediamine;
2-(1-pyrrolidyl)-ethylmethylamine;
N-allyl-N',N'-diethylethylenediamine;
N-3-(4-methylpiperazino)propyl-N-methylamine and so forth. The procedure for preparing these starting compounds and those utilized in the examples is well known in the art.

Suitable starting materials of the Formula II utilized in the process of this invention include:

2-chloronitrobenzene;
2-bromonitrobenzene;
2,5-dichloronitrobenzene;
2-chloro-6-methyl-nitrobenzene;
2-chloro-5-trifluoromethylnitrobenzene;
2,5-dichloro-nitrobenzene;
2-chloro-4-bromonitrobenzene;
5-trifluoromethyl-2,4-dichloro-nitrobenzene;
(lower alkyl)-2-halonitrobenzenes, such as 4-methyl-2-chloronitrobenzenes, 5-ethyl - 2 - bromonitrobenzene, 4-isopropyl-2-iodonitrobenzene, 5-n-hexyl - 2 - chloronitrobenzene, 4,6-dimethyl-2-chloronitrobenzene, 3,4,5-trimethyl-2-bromonitrobenzene, 4,6-diethyl - 2 - chloronitrobenzene, and 3-methyl-5-ethyl-2-chloronitrobenzene;
(lower alkoxy)-2-halonitrobenzenes, such as 4-methoxy-2-chloronitrobenzene, 5-ethoxy-2 - bromonitrobenzene, 4-propoxy - 2 - iodonitrobenzene, 4,6-diethoxy-2-chloronitrobenzene and 3,4,5-trimethoxy-2-bromonitrobenzene; and
(lower alkanoyl)-2-halonitrobenzenes, such as 4-acetyl-2-bromonitrobenzene, 5 - acetyl - 2 - chloronitrobenzene, 3-propionyl-2-iodonitrobenzene and 5-hexanoyl-2-chloronitrobenzene.

The nitro group is then reduced catalytically, as by treatment with hydrogen in the presence of a hydrogenation catalyst, such as 5 percent palladium-carbon, or chemically, as by treatment with stannous chloride or sodium hydrosulfite, to yield new intermediates of this invention of the general Formula IV:

(IV) 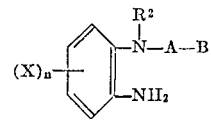

wherein X, $n$, A and B are as hereinbefore defined. Chemical reduction is preferred when $R^2$ is benzyl. The resulting amine is then reacted with a compound of the Formula V:

(V) 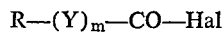 R—(Y)$_m$—CO—Hal wherein Hal, R, Y and $m$ are as herein defined, to yield the final products of this invention.

Suitable starting materials of the Formula V include: lower alkanoyl halides and bromides, such as acetyl chloride, propionyl bromides and hexanoyl chloride; lower alkenoyl halides, such as the acyl chlorides and bromides of acrylic acid, crotonic acid, 2-pentenoic acid, 2-hexenoic acid, 2-octenoic acid, 3-methylcrotonic acid, 2-methylcrotonic acid, 2-ethylacrylic acid, 2,3-dimethylcrotonic acid and 4-methyl - 2 - pentenoic acid; lower alkynoyl halides, such as the acyl chlorides and bromides of propiolic acid, butynoic acid, tetrolic acid, 2-pentyonic acid, 2-hexynoic acid and 2-octynoic acid; lower alkadienoyl halides, such as sorboyl chloride and bromide; cycloalkane carbonyl halides, such as hexahydrobenzoyl chloride and hexahydrobenzoyl bromide and cyclopentane carbonyl chloride; cycloalkane lower alkanoyl halides, such as cyclohexylacetyl chloride, 3-cyclohexylpropionyl bromide and cyclopentylacetyl chloride; benzoyl chloride; substituted benzoyl halides, such as 2,4,6 - trimethoxy-benzoyl chloride and ethoxy-benzoyl bromide; phenyl (lower alkanoyl) halide, 2-phenylpropanoyl chloride, 4 - phenylbutanoyl bromide, and 6-phenylhexanoyl chloride; (substituted phenyl) (lower alkanoyl) halides; phenyl (lower alkenoyl) halides, such as the acyl chlorides and bromides of cinnamic acid, 3-phenylcrotonic acid, 3 - phenyl - 2 - pentenoic acid, 3-phenyl - 2 - hexenoic acid, α-methylcinnamic acid 2-ethylcinnamic acid and 3-phenyl - 4 - methyl - 2 - pentenoic acid; (substituted phenyl) (lower alkenyl) halides, such as the acyl chlorides and bromides of m-nitrocinnamic acid, p-methylcinnamic acid, O,α-dimethylcinnamic acid, p-ethylcinnamic, 3,4 - dimethoxycinnamic acid, p-methoxycinnamic acid, 2,4,6 - trimethoxycinnamic acid, o-chlorocinnamic acid, p-bromocinnamic acid, 3-o-tolylcrotonic acid, 2,4 - dichlorocinnamic acid and 3-p-methoxyphenyl - 2 - pentenoic acid; phenyl (lower alkynyl) chlorides; (substituted phenyl) (lower alkynyl) halides, such as p-bromophenylpropiolyl chloride; furyl chloride; furyl (lower alkanoyl) halides, such as 2-furylacetyl chloride and 2-furylpropionyl bromide; furyl (lower alkenoyl) halides, such as 3-(2-furyl)acrylyl chloride and 3-(2-furyl)crotonyl bromide; furyl (lower alkynoyl) chlorides; 2-thiophene carbonyl chloride; thienyl (lower alkanoyl) halides, such as 2-thienylacetyl chloride and 2-thienylpropionyl bromide; thienyl (lower alkenoyl) halides, such as 3 - (2 - thienyl)acrylyl bromide and 3-(2-thienyl)crotonyl chloride; thienyl(lower alkynoyl) halides; 2-pyridinecarbonyl chloride; nicotinoyl chloride; isonicotinoyl chloride; pyridyl(lower alkanoyl) halides, such as 4-pyridylacetyl chloride and 3-(3-pyridyl)propionyl bromide; pyridyl(lower alkenoyl) halides, such as 3 - (4 - pyridyl)acrylyl chloride and 3 - (2 - pyridyl)-crotonyl bromide; pyridyl(lower alkynoyl) chlorides; piperonyl carbonyl chloride; piperonyl(lower alkynoyl) halides, such as piperonylacetyl chloride and 3-piperonylpropionyl bromide; piperonyl(lower alkenoyl) halides, such as 3-piperonylacrylyl chloride and 3-piperonylcrotonyl bromide; and piperonyl(lower alkynoyl)chlorides.

Alternately, the intermediate compound of the invention may be prepared by reacting a compound of the general Formula II with a reactant having the Formula VI:

(VI)
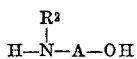

wherein R² and A are as hereinabove defined, the reaction being conducted at elevated temperatures of from between 80 to 140 degrees centigrade in an inert solvent such as toluene. The product of this reaction when reacted with a halogenating agent, e.g., phosphorus trichloride, thionyl chloride, thionyl bromide, hydrogen bromide, to give a halogenated compound having the general Formula VII;

(VII)
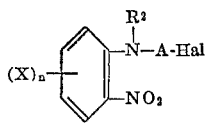

This halogen compound is then reacted with a reactant having the formula: H—B, e.g., dimethylamine, when B is as described above, to give the intermediate of Formula III.

In instances where R² is H or acyl, the starting diamine should have the Formula VIII:

(VIII)
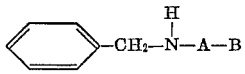

The benzyl is removed by reduction techniques; e.g., reaction with hydrogen in the presence of palladium catalyst to give the compound having the Formula IX:

(IX)
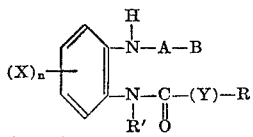

The acyl derivative is then prepared by acylation of the compound of Formula IX.

The following examples illustrate the invention, but do not limit it. All parts are by weight, moles are gram moles, and temperatures are in degrees centigrade unless otherwise stated.

EXAMPLE 1

2'-[(3-dimethylamino-2-methylpropyl)methylamino]cinnamanilide (A) Preparation of N,N,N'-2-tetramethyl-1,3-propanediamine To a solution of about 215 parts of 40 percent aqueous solution of monomethyleneamine maintained at a temperature of from minus ten to ten degrees centigrade was added about 120 parts of 3-dimethylamino-2-methylpropyl chloride hydrochloride and about 5 parts of sodium iodide. The mixture was stirred and slowly heated to about 65 degrees centigrade. At this point, about 80 parts of 95 percent ethanol was added and the resulting solution then refluxed for about three hours. The mixture was treated with about 100 parts of sodium hydroxide, cooled to room temperature and then extracted with about 215 parts of ether (four times). The ether phases were combined, dried over magnesium sulfate and the solvent evaporated. Fractionation of the residue gave 61.0 parts of colorless liquid having a boiling point of 146–148 degrees centigrade.

(B) Preparation of N-(o-nitrophenyl)-N,N',N'-2-tetramethyl-1,3-propanediamine

A mixture of 34.0 parts of material from part (A), 41.0 parts of o-chloronitrobenzene and about 175 parts of toluene was stirred and refluxed for eight hours, a solid having a yellow-orange appearance separated from the mixture. After cooling to room temperature, the mixture was treated with a solution of 65 parts of concentrated hydrochloric acid in 200 parts of water. The aqueous layer was separated and the organic phase was extracted with 50 parts of water. The aqueous layers were combined and treated with a cold solution of 40 parts of sodium hydroxide in 100 parts of water. The liberated base was extracted with about 215 parts of ether (three times). The ether phases were dried over magnesium sulfate, filtered and the solvent evaporated. Fractionation of the residue gave 33.0 parts of pale orange liquid having a boiling point of 121–123 degrees centigrade at 0.2 millimeters of mercury absolute.

(C) Preparation of N-(o-aminophenyl)-N,N',N'-2-tetramethyl-1,3-propanediamine

A solution of 29.0 parts of material from part (B) in about 80 parts ethanol was treated with a slurry of 5 parts of 5 percent palladium-carbon in about 80 parts of ethanol and the mixture placed in a Parr apparatus under three atmospheres of hydrogen. The reduction was complete in about 15 minutes, the mixture was filtered under one atmosphere of nitrogen and the filtrate was concentrated under about 15 millimeters of mercury absolute pressure. Fractionation of the residue gave 22.0 parts of colorless liquid having a boiling point of 99–101 degrees centigrade at 0.1 millimeter of mercury absolute.

(D) Preparation of 2'-[(3-dimethylaminopropyl)methylmethylamino]-cinnamanilide

A solution of 21.3 parts of material from part (C) in about 80 parts of chloroform was added dropwise to a solution of 16.0 parts of cinnamoyl chloride in about 300 parts of chloroform while maintaining the temperature at about 15–20 degrees centigrade. The resulting solution was refluxed for about one hour, cooled to room temperature and treated with 17 parts of 5.9 N alcoholic hydrogen chloride. Dilution of this solution to about 500 parts with ether gave a hygroscopic dihydrochloride salt. The mixture was treated with 250 parts of water and about 145 parts of ether. The aqueous phase was then treated with a cold solution of 10 parts of sodium hydroxide in 50 parts of water and the liberated base extracted with about 145 parts of ether (three times). The combined ether phases were washed with 100 parts of water, dried over magnesium sulfate and then filtered. After evaporation of the solvent, the pale yellow residue weighed 31.6 parts with a melting point of 83–86 degrees centigrade. Crystallization from 140 parts of hexane gave 29.5 parts of nearly colorless solid having a melting point of 84–86 degrees centigrade. Recrystallization from about 20 parts benzene-100 parts of hexane gave 25.9 parts of nearly colorless product having a melting point of about 84–86 degrees centigrade.

EXAMPLE 2

2'-[(3-dimethylaminopropyl)methylamino]cinnamanilide, hydrochloride (A) Preparation of N,N,N'-trimethyl-1,3-propane diamine Interaction of 158 parts of 3-dimethylaminopropyl chloride hydrochloride with 310 parts of 40 percent aqueous solution of monomethylamine, 10 parts sodium iodide and 100 milliliters of 95 percent ethanol according to the procedure of part (A) of Example 1 gave 53.8 parts of colorless liquid; boiling point 140–144 degrees centigrade.

(B) Preparation of N-(o-nitrophenyl)-N,N',N'-trimethyl-1,3-propanediamine

A mixture of 53.3 parts of material from part (A), 57.0 parts of o-chloronitrobenzene and 500 milliliters of toluene was refluxed for about eight hours. The product was isolated according to the procedure used in part (B) of Example 1 to give 54.8 parts of a pale orange liquid;

boiling point 121–123 degrees centigrade at 0.1 millimeter of mercury absolute.

(C) Preparation of N-(o-aminophenyl)-N,N',N'-trimethyl-1,3-propanediamine

Catalytic reduction of 54 parts (in two portions) of the material from part (B) according to the procedure described in part (C) of Example 1 gave 41.8 parts of colorless liquid; boiling point 98–100 degrees centigrade at 0.1 millimeter of mercury absolute.

(D) Preparation of 2'-dimethylamino-propyl)methyl-amino]cinnamanilide, hydrochloride A solution of 22.4 parts of material from part (C) in 100 parts of chloroform was added dropwise to a solution of 18.0 parts of cinnamoyl chloride in 200 parts of chloroform while maintaining the temperature at about 15–20 degrees centigrade. A crystalline product product separated from the solution. After stirring for about one hour at room temperature, the mixture was refluxed for about one hour, cooled and diluted to 800 parts of ether to give 48.1 parts of pale yellow product.

Recrystallization from 120 milliliters acetonitrile-120 milliliters of ether gave 35.1 parts of pale yellow solid; melting point 177–179 degrees centigrade. This material was dissolved in 170 milliliters of hot acetonitrile, added Darco and filtered. The filtrate yielded 31.5 parts of colorless product, melting point of about 177–179 degrees centigrade.

EXAMPLE 3

2'-[(2-dimethylaminoethyl)methylamino]cinnamanilide

By substituting an equivalent quantity of N,N'N'-trimethylethylenediamine in part (B), of Example 1 for the N,N,N'-2-tetramethyl-1,3-propanediamine, 2'-[(2-dimethylaminoethyl)-methylamino]cinnamanilide is obtained.

EXAMPLE 4

2'-[(2-methylphenethylaminoethyl)methylamino]cinnamanilide

By substituting an equivalent quantity of N,N'-dimethyl-N-phenethylenediamine in part (B) of Example 1 for the N,N,N'-2-tetramethyl-1,3-propanediamine, 2'-[(2 - methylphenethylaminoethyl)methylamino]cinnamanilide is obtained.

EXAMPLE 5

2'-[(2-dimethylaminoethyl)benzylamino]cinnamanilide

By substituting an equivalent quantity of N-benzyl-N',N'-dimethylethylenediamine in part (B) of Example 1 for the N,N,N'-2-tetramethyl-1,3-propanediamine, the intermediate N-benzyl-N',N'-dimethyl-N-(o-nitrophenyl)ethylenediamine is obtained. Treatment of this intermediate with an excess stannous chloride gave N-(o-aminophenyl)-N-benzyl-N',N'-dimethylethylenediamine. Interaction of the latter compound with cinnamoyl chloride according to the procedure of part (D) of Example 1 gave 2' - [(2-dimethylaminoethyl)benzylamino]cinnamanilide.

EXAMPLE 6

2'-[(2-dimethylaminoethyl)amino]cinnamanilide

A mixture of 20.0 parts of material from Example 5, 5 parts of 5 percent palladium-carbon and 200 parts of ethanol was placed in a Parr apparatus under three atmospheres of hydrogen and shaken until one equivalent of hydrogen was consumed. The catalyst was filtered and the filtrate evaporated under reduced pressure to give 2'-[(2-dimethylaminoethyl)amino]cinnamanilide.

EXAMPLE 7

2'-[N-(2-dimethylaminoethyl)acetamido]cinnamanilide hydrochloride

A solution of 31.0 parts of material from Example 6 in 100 parts of benzene was added dropwise to a solution of 7.9 parts of acetyl chloride in 200 parts of benzene at room temperature to give 2'-[N-(2-dimethylaminoethyl)acetamido]cinnamanilide hydrochloride

EXAMPLE 8

2'-[(3-dimethylamino-2-methylpropyl)methylamino]sorbanilide

Following the procedure of Example 1, but substituting an equivalent amount of sorboyl chloride for the cinnamoyl chloride in part (D), 2'-[(3-dimethylamino-2-methylpropyl)methylamino]sorbanilide is obtained.

EXAMPLE 9

2'-[(3-dimethylamino-2-methylpropyl)methylamino]furanilide

Following the procedure of Example 1, but substituting an equivalent amount of furoyl chloride for the cinnamoyl chloride in part (D), 2'-[(3-dimethylamino-2-methylpropyl)methylamino]furanilide is obtained.

EXAMPLE 10

2'-[(3-dimethylamino-2-methylpropyl)methylamino]hexahydrobenzanilide

Following the procedure of Example 1, but substituting an equivalent amount of hexahydrobenzoyl chloride for the cinnamoyl chloride in part (D), 2'-[(3-dimethylamino-2-methylpropyl)methylamino]hexahydrobenzanilide is obtained.

EXAMPLE 11

2'-[(3-dimethylaminopropyl)methylamino]-3,4,5-trimethoxybenzanilide hydrochloride Following the procedure of Example 2, but substituting an equivalent amount of 3,4,5-trimethoxybenzoyl chloride for the cinnamoyl chloride in part (D), 2'-[(3-dimethylaminopropyl)methylamino]-3,4,5 - trimethoxybenzanilide hydrochloride is obtained.

EXAMPLE 12

2'-[(3-dimethylaminopropyl)methylamino]phenacetanilide hydrochloride

Following the procedure of Example 2, but substituting an equivalent amount of phenacetyl chloride for the cinnamoyl chloride in part (D), 2'-[(3-dimethylaminopropyl)methylamino]phenacetanilide hydrochloride is obtained.

EXAMPLE 13

2'-[(3-dimethylaminopropyl)methylamino]-2,4-dichlorocinnamanilide hydrochloride

Following the procedure of Example 2, but substituting an equivalent amount of 2,4-dichlorocinnamoyl chloride for the cinnamoyl chloride in part (D), 2'-[(3-dimethylaminopropyl)methylamino] - 2,4 - dichlorocinnamanilide hydrochloride is obtained.

EXAMPLE 14

2'-[(3-diethylaminopropyl)methylamino]phenylpropiolylanilide hydrochloride

Following the procedure of Example 2, but substituting N,N-diethyl-N'-methyl-1,3-propanediamine for the N,N'-N'-trimethyl-1,3-propanediamine in part (B) and phenylpropiolyl chloride for cinnamoyl chloride in part (D), 2' - [(3 - diethylaminopropyl)methylamino]phenylpropiolylanilide hydrochloride is obtained.

EXAMPLE 15

4'-chloro-2'-[(2-dimethylaminoethyl)methylaminol]-p-methylcinnamanilide hydrochloride (A) Preparation of N-(5-chloro-2-nitrophenyl)-N,N',N'-trimethylethylenediamine This material is prepared by the reaction of equivalent quantities of 2,4-dichloronitrobenzene with N,N',N'-trimethylethylenediamine according to the procedure of Example 2, part (B).

(B) Preparation of N-(2-amino-5-chlorophenyl)-N,N',N'-trimethylethylenediamine

This material is prepared according to the procedures of Example 2, part (C).

(C) Preparation of 4'-chloro-2'-[(2-dimethylaminoethyl)methylamino]-p-methylcinnamanilide hydrochloride This material is prepared by the interaction of the material from part (B) with one equivalent of p-methylcinnamoyl chloride according to the procedure utilized in Example 2, part (D).

EXAMPLE 16

5'-trifluoromethyl-2'-[(2-dimethylaminoethyl)methylamino]cinnamanilide hydrochloride Utilizing 2-chloro-5-trifluoromethylnitrobenzene in lieu of 2,4-dichloronitrobenzene in Example 15, the hydrochloride salt of 5'-trifluoromethyl-2'-[(2-dimethylaminoethyl)methylamino]cinnamanilide is recovered.

EXAMPLE 17

5'-dimethylamino-2'-[(2-dimethylaminoethyl)methylamino]cinnamanilide hydrochloride Utilizing 2-chloro-5-dimethylaminonitrobenzene in lieu of 2,4-dichloronitrobenzene in Example 15, the hydrochloride salt of 5'-dimethylamino-2'-[(2-dimethylaminoethyl)methylamino]cinnamanilide is recovered.

EXAMPLE 18

4'-methoxy-2'-[(2-dimethylaminoethyl)methylamino]cinnamanilide hydrochloride

Utilizing 2-chloro-4-methoxynitrobenzene in lieu of 2,4-dichloronitrobenzene in Example 15, the hydrochloride salt of 4'-methoxy-2'-[(2-dimethylaminoethyl)methylamino]cinnamanilide is recovered.

EXAMPLE 19

5'-acetyl-2'-[(3-dimethylaminopropyl)methylamino]cinnamanilide hydrochloride

Substituting 5-acetyl-2-chloronitrobenzene for the o-chloronitrobenzene in part (A) of Example 2, gives N-(4-acetyl-2-nitrophenyl)-N,N',N'-trimethyl-1,3-propanediamine. Reduction of this material, as in part (B) of Example 15, gives N-(5-acetyl-2-aminophenyl)-N,N',N'-trimethyl-1,3-propanediamine. The reaction of this product with cinnamoyl chloride, as in part (C) of Example 15, gives 5'-acetyl-2'-[(3-dimethylaminopropyl)methylamino]cinnamanilide hydrochloride.

EXAMPLE 20

2'-{[3-(4-methylpiperazino)propyl]methylamino}cinnamanilide

By substituting an equivalent quantity of 1-(3-chloropropyl)-4-methylpiperazine for the 3-dimethylamino-2-methylpropyl chloride hydrochloride in Example 1, the product obtained is 2'-{[3-(4-methylpiperazino)propyl]methylamino}cinnamanilide.

EXAMPLE 21

2'-{[3-(4-β-hydroxyethylpiperazino)propyl]methylamino}cinnamanilide

Utilizing the procedure of Example 20, but substituting 1-(3-chloropropyl)-4-(2-hydroxyethyl)piperazine in lieu of 3-dimethylamino-2-methylpropyl chloride hydrochloride, the product obtained is 2'-{[3-(4-β-hydroxyethylpiperazino)propyl]methylamino}cinnamanilide.

EXAMPLE 22

2' {[3-(4-cinnamylpiperazino)propyl]methylamino} cinnamanilide

Utilizing the procedure of Example 20, but substituting 1-(3-chloropropyl)-4-cinnamyl piperazine in lieu of 3-dimethylamino-2-methylpropyl chloride hydrochloride the product obtained is 2'-{[3-(4-cinnamylpiperazino)propyl]methylamino}cinnamanilide.

EXAMPLE 23

2-{[3-(4-o-methoxyphenylpiperazino)propyl]methylamino}cinnamanilide

Utilizing the procedure of Example 20, but substituting 1-(3-chloropropyl)-4-(o - methoxyphenyl)piperazine in lieu of 3-dimethylamino-2-methylpropyl chloride hydrochloride, the product obtained is 2-{[3-(4-o-methoxyphenylpiperazino)propyl]methylamino}cinnamanilide.

EXAMPLE 24

2'-{[3-(4α-pyridylpiperazino)propyl]methylamino} cinnamanilide

Utilizing the procedure of Example 20, but substituting 1-(3-chloropropyl)-4-(2-piperidyl)piperazine in lieu of 3-dimethylamino-2 - methylpropyl chloride hydrochloride, the product obtained is 2'-{[3-(4α-pyridylpiperazino)propyl]methylamino}cinnamanilide.

EXAMPLE 25

2'-[(2-pyrrolidinopropyl)methylamino]cinnamanilide

Utilizing the procedure of Example 20, but substituting 1-(2-chloropropyl)-pyrrolidine in lieu of 3-dimethylamino-2-methylpropyl chloride hydrochloride, the product obtained is 2'-[(2-pyrrolidinopropyl)methylamino]cinnamanilide.

EXAMPLE 26

2'-[3-piperidinopropyl)methylamino]cinnamanilide

Utilizing the procedure of Example 20, but substituting 1-(3-chloropropyl)piperidine in lieu of 3-dimethylamino-2-methylpropyl chloride hydrochloride, the product obtained is 2'-[(3 - piperidinopropyl)methylamino]cinnamanilide.

EXAMPLE 27

2'-[(3-morpholinobutyl)methylamino]cinnamanilide

Utilizing the procedure of Example 20, but substituting 4-(3-chlorobutyl)morpholine in lieu of 3-dimethylamino-2-methylpropyl chloride hydrochloride, the product obtained is 2'-[(3 - morpholinobutyl)methylamino]cinnamanilide.

The invention may be variously otherwise embodied within the scope of the appended claims.

What is claimed is:

1. A compound having the name 2'-[(3-dimethylaminopropyl)methylamino]cinnamanilide hydrochloride.
2. A compound of the formula:

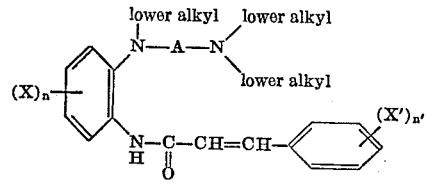

wherein X and X' are selected from the group consisting of hydrogen, halogen, trifluoromethyl, nitro, lower alkyl, lower alkoxy and lower alkanoyl; $n$ and $n'$ are selected from the group of integers consisting of one and two and A is selected from the group consisting of ethylene and propylene and pharmaceutically acceptable salts thereof.

References Cited

UNITED STATES PATENTS

| 2,935,514 | 5/1960 | Hoffmann et al. | 260—309.2 |
| 2,942,002 | 6/1960 | Hoffmann et al. | 260—309.2 |

FOREIGN PATENTS

| 907,646 | 10/1962 | England | 260—239 |

OTHER REFERENCES

Chemical Abstracts, vol. 35, cols. 2870 to 2871 (1941).

McKee et al.: J. Am. Chem. Soc., vol. 68, pp. 1904 to 1905 (1946).

Hoffmann: Imidazole and Its Derivatives, Part I, pp. 256-265, Interscience Publishers, Inc. N.Y. (1953).

JOHN D. RANDOLPH, Primary Examiner

U.S. Cl. X.R.

260—240 J, 243 R, 256.4 R, 293.67, 293.68, 293.78, 295 AM, 326.5, 326.85, 577, 999